(12) United States Patent
Wang et al.

(10) Patent No.: US 8,578,433 B2
(45) Date of Patent: Nov. 5, 2013

(54) METHOD AND APPARATUS FOR EVALUATING PERFORMANCE FOR A VIDEO BROADCAST AND/OR MULTICAST

(75) Inventors: Yao Wang, Old Bridge, NJ (US); Jill MacDonald Boyce, Princeton, NJ (US); Zhenyu Wu, Plainsboro, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1445 days.

(21) Appl. No.: 11/919,101

(22) PCT Filed: Mar. 3, 2006

(86) PCT No.: PCT/US2006/007736
§ 371 (c)(1),
(2), (4) Date: Oct. 23, 2007

(87) PCT Pub. No.: WO2006/121493
PCT Pub. Date: Nov. 16, 2006

(65) Prior Publication Data
US 2009/0059010 A1    Mar. 5, 2009

Related U.S. Application Data

(60) Provisional application No. 60/678,573, filed on May 6, 2005.

(51) Int. Cl.
| | | |
|---|---|---|
| *H04H 60/33* | (2008.01) | |
| *H04N 7/173* | (2006.01) | |
| *G01R 31/08* | (2006.01) | |
| *G06F 11/00* | (2006.01) | |
| *G08C 15/00* | (2006.01) | |
| *H04J 1/16* | (2006.01) | |
| *H04J 3/14* | (2006.01) | |
| *H04L 1/00* | (2006.01) | |
| *H04L 12/26* | (2006.01) | |
| *H04L 12/28* | (2006.01) | |

(52) U.S. Cl.
USPC ...... 725/96; 725/9; 725/86; 725/95; 370/229; 370/230; 370/232; 370/233; 370/234; 370/351

(58) Field of Classification Search
USPC .......................................................... 725/86
See application file for complete search history.

(56) References Cited

U.S. PATENT DOCUMENTS 5,121,383 A * 6/1992 Golestani .................... 370/235
6,895,216 B2    5/2005 Sato et al.
(Continued)

FOREIGN PATENT DOCUMENTS

JP    2002-244560 A2    9/2000
JP    2001-320324        11/2001
(Continued)

OTHER PUBLICATIONS

Campbell, "Meeting End-to-End ZoS Challenges for Scalable Flows in Heterogeneous Multimedia Environments", XP000607976, Columbia University, New York, NY.
(Continued)

*Primary Examiner* — Justin Shepard
(74) *Attorney, Agent, or Firm* — Robert D. Shedd; Guy H. Eriksen; Ronald J. Kolczynski

(57) ABSTRACT

There are provided methods and apparatus for measuring a received quality of at least one of a video multicast and a video broadcast for a plurality of users. A method includes receiving data from the plurality of users regarding the received quality, and increasing a weight of the data for any of the plurality of users having the received quality greater than a threshold.

25 Claims, 2 Drawing Sheets

(56) References Cited

U.S. PATENT DOCUMENTS

| | | | |
|---|---|---|---|
| 7,486,638 | B2 | 2/2009 | Ofuji et al. |
| 7,593,746 | B2 | 9/2009 | Willenegger et al. |
| 7,907,952 | B2 | 3/2011 | Lee et al. |
| 2002/0116715 | A1* | 8/2002 | Apostolopoulos ............... 725/86 |
| 2003/0046708 | A1* | 3/2003 | Jutzi ............................ 725/120 |
| 2003/0112996 | A1 | 6/2003 | Holliman et al. |
| 2004/0156353 | A1* | 8/2004 | Bevan et al. ................... 370/351 |

FOREIGN PATENT DOCUMENTS

| | | |
|---|---|---|
| JP | 2003229894 | 8/2003 |
| JP | 2005-525032 | 8/2005 |
| JP | 2007-503152 | 2/2007 |
| KR | 10-2003-0065370 | 8/2003 |
| WO | WO0209429 | 1/2002 |
| WO | WO0235844 | 5/2002 |

OTHER PUBLICATIONS

Kwon et al., "An Adaptive Rate Allocation to Source-Channel Coding for Internet Video", Department of Electrical Engineering, 2002 IEEE.

Majumdar, et al., "Multicast and Unicast Real-Time Video Streaming Over Wireless LANs", IEEE Transactions on Circuits and Systems for Video Technology, vol. 12, No. 6, Jun. 2002.

* cited by examiner

METHOD AND APPARATUS FOR EVALUATING PERFORMANCE FOR A VIDEO BROADCAST AND/OR MULTICAST

CROSS-REFERENCE TO RELATED APPLICATIONS

This application is a National Stage Application and claims the benefit, under 35 U.S.C. §365 of International Application PCT/US2006/007736 filed Mar. 03, 2006, which was published in accordance with PCT Article 21(2) on Nov. 16, 2006 in English, and which claims the benefit of U.S. Provisional Patent Application No. 60/678,573 filed on May 6, 2005.

FIELD OF THE INVENTION

The present invention relates generally to video broadcasting and/or multicasting and, more particularly, to a method and apparatus for measuring performance for video broadcast and/or multicast.

BACKGROUND OF THE INVENTION

In a video broadcast and/or multicast (hereinafter also referred to collectively as "broadcast/multicast") application, irrespective of whether over a wireless or a wired network, the recipients of the same video may experience different channel conditions at the same time. Furthermore, the same recipient (s) may also experience different channel conditions at different times. Consequently, the decoded video qualities (either perceptual or in terms of an objective quality measure) for different recipients, or the same recipient at different times, varies.

In accordance with some prior art broadcast/multicast systems, such systems are designed to satisfy a target quality for the user with the worst channel condition (i.e., the highest loss rate). Using this typical approach, users with good channels are unnecessarily penalized.

In one prior art approach, it has been proposed to minimize the maximum performance degradation due to multicast among multiple users. An example of this prior art approach will now be provided, where a single user i with a loss rate $p_i$ is considered. Given the total rate constraint $R_t$, the optimal source coding and channel coding parameters $A_i$ are chosen to minimize the expected end-to-end distortion for this user, with a corresponding minimal distortion $D_{opt}^i$, as follows:

$$A_i = \arg\min_{A:R_e/r<=R} D(p_i, A), \quad D_{opt}^i = D(p_i, A_i) \quad (1)$$

In the multicast/broadcast case, for a particular source/channel coding scheme characterized by parameter set $A_M$, the end-to-end distortion for user i is $D_M^i(p_i, A_M)$. In the prior art approach, it has been proposed to choose $A_M$ to minimize the maximum performance degradation among all users. Specifically, $$A_M = \arg\min_{A:R_e/r<=R_t} \left\{ \max_i [D_M^i(p_i, A) - D_{opt}^i] \right\} \quad (2)$$

In this way, the receiving quality of each user can be degraded from its optimal performance by a certain amount. However, none of the users are overly penalized.

A problem with the above measure is that it is quite complex to compute. System optimization based on this metric requires intense computation. Moreover, it is also not clear whether equalizing performance degradation due to multicast is an appropriate design criterion.

SUMMARY OF THE INVENTION

These and other drawbacks and disadvantages of the prior art are addressed by the present invention, which is directed to a performance metric for video broadcast and/or multicast, and systems, devices, and methods using the same.

According to an aspect of the present invention, there is provided a method for measuring a received quality of at least one of a video multicast and a video broadcast for a plurality of users. The method includes receiving data from the plurality of users regarding the received quality, and increasing a weight of the data for any of the plurality of users having the received quality greater than a threshold.

According to another aspect of the present invention, there is provided an apparatus for measuring a received quality of at least one of a video multicast and a video broadcast for a plurality of users. The apparatus includes an encoder for receiving data from the plurality of users regarding the received quality, and increasing a weight of the data for any of the plurality of users having the received quality greater than a threshold.

According to yet another aspect of the present invention, there is provided an apparatus for measuring a received quality of at least one of a video multicast and a video broadcast for a plurality of users. The apparatus includes means for receiving data from the plurality of users regarding the received quality, and means for increasing a weight of the data for any of the plurality of users having the received quality greater than a threshold.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION

Figure 1:
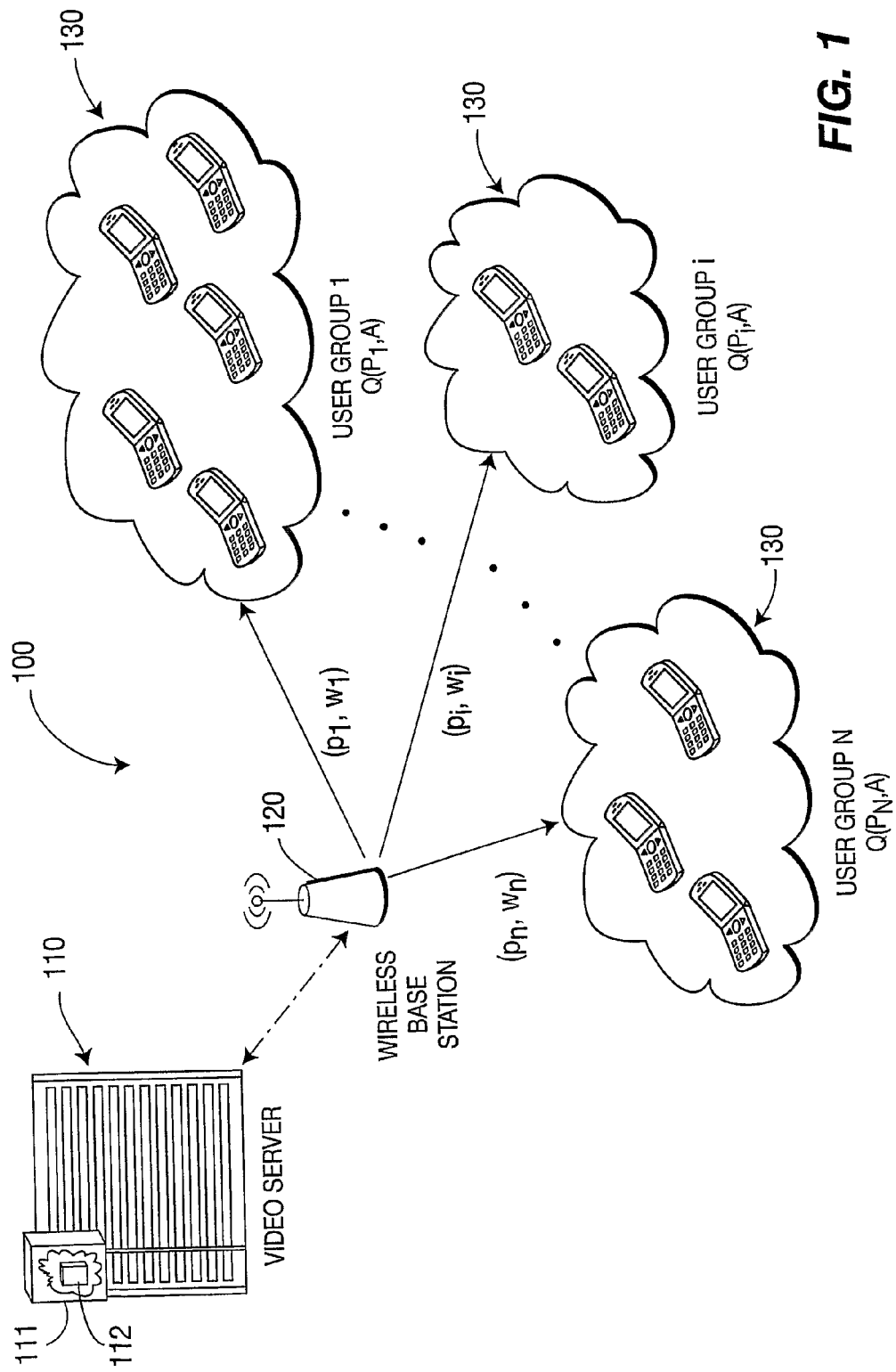
FIG. 1 is a block diagram illustrating an exemplary wireless broadcast/multicast system to which the principles of the present invention may be applied.

The present invention is directed to a performance metric for video broadcast and/or multicast, and systems, devices, and methods using the same. It is to be appreciated that the present invention may be applied to wireless systems, wired systems, and systems having both wireless and wired links. Moreover, it is to be further appreciated that, given the teachings of the present principles provided herein, one of ordinary skill in this and related arts will contemplate applications for the metric similar to as described herein as well as other applications, while maintaining the scope of the present invention.

In accordance with the present principles, a metric is provided for use in measuring the overall quality of all the recipients (or, at the least, a set of recipients, where the set includes at least two members) of the same multicast video. In an embodiment, the metric may be used, e.g., to optimize the design of a video encoder and/or any error protection mechanism to be added to the encoded bit stream (such as, but not limited to, e.g., forward error correction (FEC) codes). The metric disclosed in accordance with the present principles is significantly easier to compute than that employed in the above-described prior art approach.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

One possible exemplary application for the application of the principles of the present invention is regarding the designing and/or operating of a video broadcast and/or multicast (hereinafter "broadcast/multicast") server. Such a server may include a video encoder that generates a stream of video packets and a channel encoder that applies cross-packet channel coding to the video packets. The recipients of the broadcast/multicast video may be connected to the server via different access links (wired or wireless) and typically experience different video packet loss rates. The video encoder can vary a variety of parameters including, e.g., the bit rate $R_e$ and some error resilience features (collectively denoted by $\beta$, which may include, but is not limited to, the intra frame rate, the intra block rate, the packet size, and so forth). The channel encoder can vary the channel code rate r. Suppose that we are given the total bandwidth allocated for streaming one video file, denoted by $R_t$. In designing the video multicast/broadcast server, a design consideration is the determination of the optimal operating parameters in terms of $R_e$, $\beta$, and r, and so forth (collectively denoted by A), so that a certain performance metric is optimized under the constraint that the total transmitted bit rate $R_e/r <= R_t$. Other constraints in terms of delay and complexity may also be imposed. It is to be appreciated that while the metric described herein with respect to the present principles can be used in wireless and/or wired video broadcast/multicast applications, one possible exemplary application is for wireless video broadcast/multicast, where the channel conditions tend to vary greatly among users and at different times.

Turning to FIG. 1, a wireless broadcast/multicast system is indicated generally by the reference numeral 100. The wireless broadcast/multicast system includes a video server 110 having an encoder 111, a wireless base station 120, and a plurality of users 130. The encoder 111 may include a forward error correction module 112. It is to be appreciated that embodiments of the present invention may be performed by the video server 110, the encoder 111, and/or the forward error correction module 112. Of course, given the teachings of the present principles provided herein, one of ordinary skill in this and related arts will contemplate these and other elements for implementing the present principles, while maintaining the scope of the principles of the present invention.

The wireless base station 120 is capable of communication with the video server 11 and is further capable of broadcasting/multicasting video signal data (e.g., and hereinafter "video programs") to each of the plurality of users 130. In this way, video programs may be delivered wirelessly from the video server 110 to any of the users 130 via the wireless base station 120.

Depending on wireless link conditions, the users 130 may experience different data loss rates. These users can be divided into N groups, so that each group of users has a similar loss rate. An operator can hence select a desired weight $w_i$ for each group, and optimize the overall system performance according to the metric $Q_M(A)$ as defined herein.

It is to be appreciated that while the present principles are described with respect to the wireless broadcast/multicast system 100 of FIG. 1, the present principles are not so limited and, thus, may be applied to other broadcast/multicast systems including wired broadcast/multicast systems, and systems employing both wired and wireless links. Given the teachings of the principles of the present invention described herein, one of ordinary skill in this and related arts will contemplate similar applications to those described herein, as well as other applications for the principles of the present invention, while maintaining the scope of the present invention.

A description will now be given regarding an exemplary calculation of the performance metric in accordance with the present principles. The description will be followed by a method for the same and the use thereof with respect to FIG. 2.

Let $p_i$ denote one possible transport packet loss rate among all users at all different times of the same video broadcast/multicast session, and $Pr.(p_i)$ denote the probability of $p_i$ (i.e., the percentage of users with loss rate $p_i$). Further, let $Q(p;A)$ denote the achievable quality (in terms of a chosen quality measure) at channel loss rate p, for a chosen set of source and channel coding parameters A. The performance metric in accordance with the present principles is a weighted average of the achievable quality levels by users with different channel conditions, where the weights depend on the user channel conditions, as follows:

$$Q_M(A) = \sum_i w(p_i) Pr \cdot (p_i) Q(p_i; A), \qquad (3)$$

where $w(p_i)$ is a weight depending on $p_i$ and satisfying $$\sum_i w(p_i) Pr \cdot (p_i) = 1.$$

One possible form of $w(p_i)$ is:

$$w(p_i) = a; \qquad (4)$$

In this case of equation (4), all users are considered equally. Another possible form of $w(p_i)$ is:

$$w(p_i) = \begin{cases} a & p_i \leq p_{max} \\ 0 & p_i > p_{max} \end{cases} \qquad (5)$$

In this case, users with loss rates greater than $p_{max}$ are not considered, and hence can have worse quality. This is appropriate, e.g., when the service contract with the users is such that a user accepts low quality when the user is in a bad channel condition, with the expectation that the user will receive better quality when the user is in a good channel condition.

$$w(p_i) = \begin{cases} a & p_i \leq p_{max} \\ ae^{-\alpha(p_i - p_{max})} & p_i > p_{max} \end{cases} \qquad (6)$$

In this case, users with loss rate $<=p_{max}$ are considered equally, users with higher loss rates are given weights decreasing with their loss rates. Note that (6) includes (4) and (5) as special cases, with $\alpha=0$ corresponding to (4), and $\alpha=\infty$ corresponding to (5). Generally, the system designer can choose a suitable $\alpha$ depending on some targeted cost vs. user-satisfaction trade-off.

In either case, the constants a and $\alpha$ should be chosen to satisfy $$\sum_i w(p_i) Pr \cdot (p_i) = 1.$$

Figure 2:
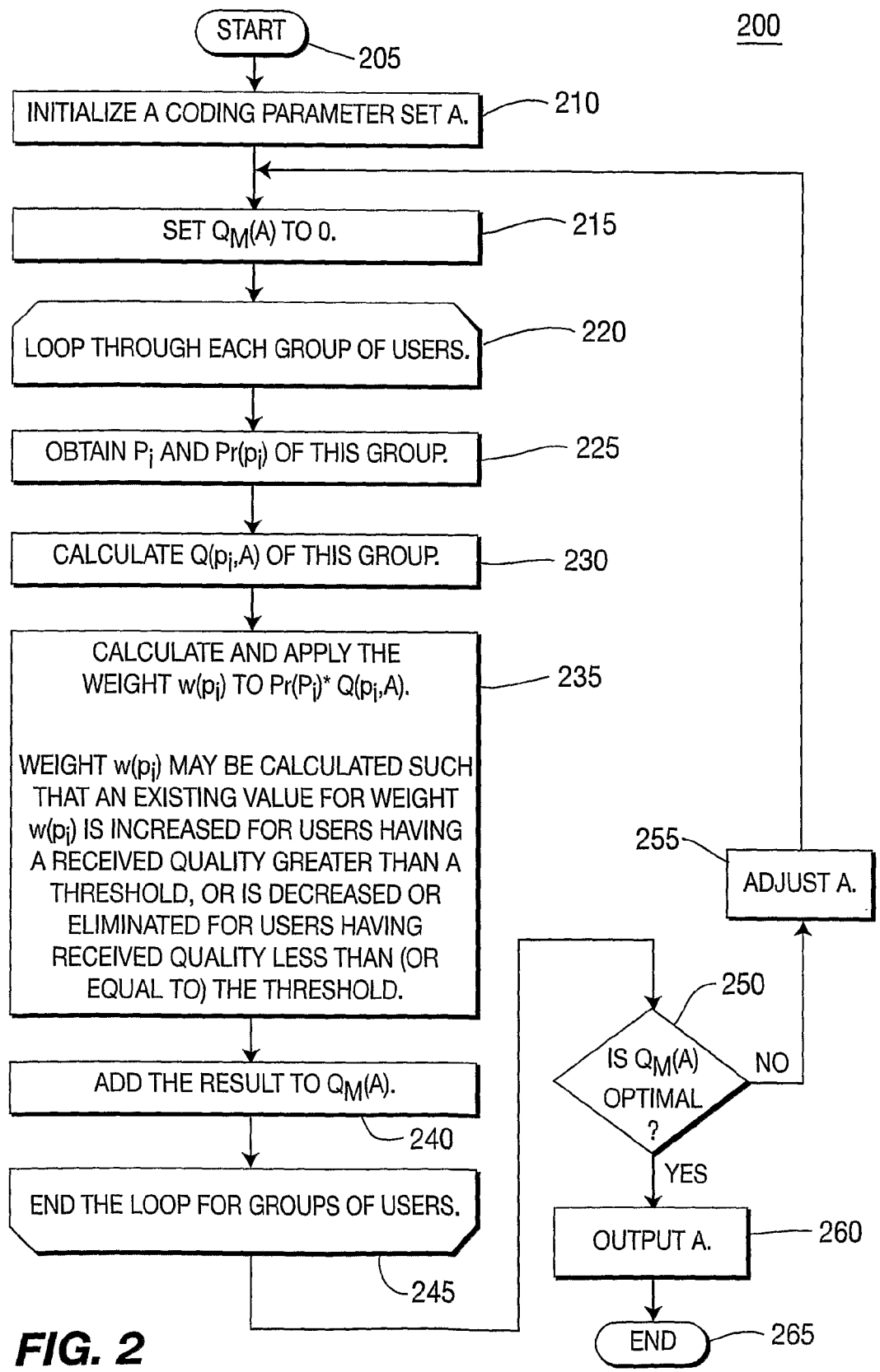
FIG. 2 is a flow diagram illustrating a method for obtaining and applying a performance metric for broadcast/multicast in accordance with the principles of the present invention.

Turning to FIG. 2, an exemplary method for calculating a video quality metric $Q_M(A)$ and using the same to optimize the performance of a broadcast/multicast system is indicated generally by the reference numeral 200. In the exemplary method 200 of FIG. 2, the performance of the broadcast/multicast system is optimized by adjusting the coding parameter set A.

A start block 205 begins the method, and passes control to a function block 210. The function block 210 initializes a coding parameter set A, and passes control to a function block 215. The function block 215 sets $Q_M(A)$ to zero (0), and passes control to a loop limit block 220. The loop limit block 220 begins a loop that loops through each of the user groups, and passes control to a function block 225.

The function block 225 obtains $P_i$ and $Pr(p_i)$ of a current group, and passes control to a function block 230. The function block 230 calculates Q(pi,A) of the current group, and passes control to a function block 235. The function block 235 calculates the weight $w(p_i)$ and applies the weight $w(p_i)$ to $Pr(p_i)*Q(p_i,A)$, and passes control to a function block 240.

In an exemplary embodiment, the weight $w(p_i)$ is calculated by function block 235 such that an existing weight value is increased for any of the users having a received quality greater than a threshold. Moreover, in the exemplary embodiment, the weight $w(p_i)$ is calculated by the function block 235 such that the existing weight value is decreased or eliminated for any of the users having a received quality less than (or equal to) the threshold. Of course, given the teachings of the present principles provided herein, this and other variations for adjusting the weight $w(p_i)$ may be employed, while maintaining the scope of the present principles.

The function block 240 adds the result to $Q_M(A)$, and passes control to a loop limit block 245. The loop limit block 245 ends the loop for all user groups, and passes control to a decision block 250. The decision block 250 determines whether or not $Q_M(A)$ is optimal. If not, then control is passed to a function block 255. Otherwise, control is passed to a function block 260.

The function block 255 adjusts A, and returns control to function block 215.

The function block 260 outputs A, and passes control to an end block 265.

As noted above, while the metric in accordance with the present principles has been described herein with respect to a wireless broadcast/multicast system, the metric may also be implemented in wired broadcast/multicast systems as well as broadcast/multicast systems that employ both wireless and wired links/aspects, while maintaining the scope of the present invention. Moreover, given the teachings of the present principles provided herein, one of ordinary skill in this and related arts will contemplate these and other applications for the metric described herein, while maintaining the scope of the present invention.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. A method for measuring a received quality of at least one of a video multicast and a video broadcast for a plurality of users, comprising:
  receiving data from the plurality of users regarding the received quality;
  increasing a weight of the data for any of the plurality of users having the received quality greater than a threshold; and
  calculating a performance metric based on the weight of the data and a probability of a loss rate among the plurality of users for the at least one of the video multicast and the video broadcast.

2. The method of claim 1, further comprising adjusting source and channel coding parameters for at least one of the plurality of users based on the weight of the data.

3. The method of claim 1, wherein at least two of the plurality of users have different channel conditions, the performance metric represents a weighted average of achievable quality levels by the plurality of users, and the method further comprises adjusting source and channel coding parameters for at least one of the plurality of users, based on the performance metric.

4. The method of claim 1, wherein the weight of the data for any of the plurality of users having the received quality less than the threshold is either decreased or eliminated.

5. The method of claim 4, wherein the weight of the data for any of the plurality of users having the received quality less than the threshold is decreased in an amount relative to a difference from the threshold.

6. The method of claim 1, wherein at least two of the plurality of users have different channel conditions, $p_i$ denotes the loss rate among the plurality of users for the at least one of the video multicast and the video broadcast, $Pr.(p_i)$ denotes the probability of $p_i$, $Q(p; A)$ denotes an achievable quality at the loss rate, for a chosen set of source and channel coding parameters A, and the method comprises calculating the performance metric $Q_M(A)$ as follows:

$$Q_M(A) = \sum_i w(p_i) Pr \cdot (p_i) Q(p_i; A),$$

wherein $w(p_i)$ is the weight of the data depending on $p_i$ and satisfying $$\sum_i w(p_i) Pr \cdot (p_i) = 1.$$

7. The method of claim 6, wherein the performance metric corresponds to a weighted average of achievable quality levels by the plurality of users and is dependent upon the different channel conditions.

8. The method of claim 6, wherein $w(p_i)$ is calculated as follows:

$$w(p_i) = \alpha,$$

wherein $\alpha$ is a constant such that the weight of the data is the same for each of the plurality of users.

9. An apparatus for measuring a received quality of at least one of a video multicast and a video broadcast for a plurality of users, comprising:
  an encoder for receiving data from the plurality of users regarding the received quality, increasing a weight of the data for any of the plurality of users having the received quality greater than a threshold, and calculating a performance metric based on the weight of the data and a probability of a loss rate among the plurality of users for the at least one of the video multicast and the video broadcast.

10. The apparatus of claim 9, wherein said encoder adjusts source and channel coding parameters for at least one of the plurality of users based on the weight of the data.

11. The apparatus of claim 9, wherein at least two of the plurality of users have different channel conditions, the performance metric represents a weighted average of achievable quality levels by the plurality of users, and said encoder adjusts source and channel coding parameters for at least one of the plurality of users, based on the performance metric.

12. The apparatus of claim 9, wherein said encoder either decreases or eliminates the weight of the data for any of the plurality of users having the received quality less than the threshold.

13. The apparatus of claim 12, wherein said encoder decreases the weight of the data for any of the plurality of users having the received quality less than the threshold in an amount relative to a difference from the threshold.

14. The apparatus of claim 9, wherein at least two of the plurality of users have different channel conditions, $p_i$ denotes the loss rate among the plurality of users for the at least one of the video multicast and the video broadcast, $Pr.(p_i)$ denotes the probability of $p_i$, $Q(p; A)$ denotes an achievable quality at the loss rate, for a chosen set of source and channel coding parameters A, and said encoder calculates the performance metric $Q_M(A)$ as follows:

$$Q_M(A) = \sum_i w(p_i)Pr \cdot (p_i)Q(p_i; A),$$

wherein w($p_i$) is the weight of the data depending on $p_i$ and satisfying $$\sum_i w(p_i)Pr \cdot (p_i) = 1.$$

15. The apparatus of claim 14, wherein the performance metric corresponds to a weighted average of achievable quality levels by the plurality of users and is dependent upon the different channel conditions.

16. The apparatus of claim 14, wherein w($p_i$) is calculated as follows:

w($p_i$)=α, wherein α is a constant such that the weight of the data is the same for each of the plurality of users.

17. The apparatus of claim 9, wherein said encoder is comprised in a video server located remotely from the plurality of users.

18. An apparatus for measuring a received quality of at least one of a video multicast and a video broadcast for a plurality of users, comprising:
   means for receiving data from the plurality of users regarding the received quality;
   means for increasing a weight of the data for any of the plurality of users having the received quality greater than a threshold; and
   means for calculating a performance metric based on the weight of the data and a probability of a loss rate among the plurality of users for the at least one of the video multicast and the video broadcast.

19. The apparatus of claim 18, further comprising means for adjusting source and channel coding parameters for at least one of the plurality of users based on the weight of the data.

20. The apparatus of claim 18, wherein at least two of the plurality of users have different channel conditions, the performance metric represents a weighted average of achievable quality levels by the plurality of users, and the apparatus further comprises means for adjusting source and channel coding parameters for at least one of the plurality of users, based on the performance metric.

21. The apparatus of claim 18, wherein the weight of the data for any of the plurality of users having the received quality less than the threshold is either decreased or eliminated.

22. The apparatus of claim 21, wherein the weight of the data for any of the plurality of users having the received quality less than the threshold is decreased in an amount relative to a difference from the threshold.

23. The apparatus of claim 18, wherein at least two of the plurality of users have different channel conditions, $p_i$ denotes the loss rate among the plurality of users for the at least one of the video multicast and the video broadcast, Pr.($p_i$) denotes the probability of $p_i$, Q(p; A) denotes an achievable quality at the loss rate, for a chosen set of source and channel coding parameters A, and the performance metric $Q_M$(A) is calculated as follows:

$$Q_M(A) = \sum_i w(p_i)Pr \cdot (p_i)Q(p_i; A),$$

wherein w($p_i$) is the weight of the data depending on $p_i$ and satisfying $$\sum_i w(p_i)Pr \cdot (p_i) = 1.$$

24. The apparatus of claim 23, wherein the performance metric corresponds to a weighted average of achievable quality levels by the plurality of users and is dependent upon the different channel conditions.

25. The apparatus of claim 23, wherein w($p_i$) is calculated as follows:

w($p_i$)=α, wherein α is a constant such that the weight of the data is the same for each of the plurality of users.

* * * * *